United States Patent [19]
Yokoyama et al.

[11] Patent Number: 5,338,472
[45] Date of Patent: Aug. 16, 1994

[54] ELECTROLYTIC SOLUTION FOR ELECTROLYTIC CAPACITOR

[75] Inventors: Yutaka Yokoyama; Tatsunori Tsuji, both of Tokyo; Makoto Ue; Tomohiro Sato, both of Ibaraki, all of Japan

[73] Assignees: Nippon Chemi-Con Corporation; Mitsubishi Petrochemical Co., Ltd., both of Tokyo, Japan

[21] Appl. No.: 977,640

[22] Filed: Nov. 17, 1992

[30] Foreign Application Priority Data

Nov. 19, 1991 [JP] Japan ................... 3-330152

[51] Int. Cl.⁵ .......... H01G 9/02; H01M 6/16
[52] U.S. Cl. .................. 252/62.2; 429/197; 429/198
[58] Field of Search .......... 252/62.2, 500, 304, 252/306, 308, 315.6; 429/194, 197, 198

[56] References Cited

U.S. PATENT DOCUMENTS

| | | | |
|---|---|---|---|
| 3,202,611 | 8/1965 | Canty et al. | 252/62.2 |
| 4,715,976 | 12/1987 | Mori et al. | 252/62.2 |
| 4,812,951 | 3/1989 | Melody et al. | 252/62.2 |
| 5,141,827 | 8/1992 | Fritz et al. | 252/62.2 |

FOREIGN PATENT DOCUMENTS

| | | |
|---|---|---|
| 0227433 | 7/1987 | European Pat. Off. . |
| 0325919 | 8/1989 | European Pat. Off. . |
| 212351 | 8/1984 | Fed. Rep. of Germany . |
| 3-209810 | 9/1991 | Japan . |
| 4-12512 | 1/1992 | Japan . |
| 4-58512 | 2/1992 | Japan . |

OTHER PUBLICATIONS

Maier, *J. Phys. Chem. Solids*, 46(3), pp. 309–320, (1985).
Dudney, *Journal of the American Ceramic Society*, 68(10), pp. 538–545, (1985).
Patent Abstracts of Japan, vol. 015, No. 482 (E-1142) Dec. 6, 1991 & JP-A-32 09 810 (Elna Co. Ltd) Sep. 12, 1991.

*Primary Examiner*—Prince Willis, Jr.
*Assistant Examiner*—Alan D. Diamond
*Attorney, Agent, or Firm*—Sughrue, Mion, Zinn, Macpeak & Seas

[57] ABSTRACT

An electrolytic solution for an electrolytic capacitor is disclosed, comprising a basic solution comprising a mixed solvent of γ-butyrolactone and ethylene glycol having dissolved therein a quaternary alkylammonium salt of phthalic acid, maleic acid or benzoic acid as a solute, the basic solution further containing from 0.5 to 10 parts by weight of colloidal silica and from 0.5 to 8 parts by weight of at least one phosphorus compound selected from dialkyl phosphate and phosphorous acid, per 100 parts by weight of the basic solution. The electrolytic solution has an increased dielectric strength while retaining high conductivity.

9 Claims, No Drawings

ELECTROLYTIC SOLUTION FOR ELECTROLYTIC CAPACITOR

FIELD OF THE INVENTION

This invention relates to an electrolytic solution used in an electrolytic capacitor, and more particularly to an electrolytic solution having high conductivity and high dielectric strength.

BACKGROUND OF THE INVENTION

An electrolytic capacitor uses, as an anode, a base metal, such as aluminum or tantalum, with its surface oxidized by, for example, anodizing to form an insulating oxidized film as a dielectric layer. This anode faces a cathode with a separator supporting an electrolytic solution therebetween.

The anode usually has an etched surface to increase its surface area. The electrolytic solution that is in close proximity with the etched uneven surface of the anode functions essentially as a cathode. Properties of the electrolytic solution, such as conductivity and temperature characteristics, are therefore decisive on the electrical characteristics of an electrolytic capacitor. Further, since the electrolytic solution serves to restore a deteriorated or damaged insulating oxidized film, it has influences on the leakage current or durability of the electrolytic capacitor. Thus, an electrolytic solution is an important element in determining the characteristics of an electrolytic capacitor.

Of the various characteristics of an electrolytic solution, conductivity is directly related to a loss, an impedance characteristic, etc. of an electrolytic capacitor. From this standpoint, intensive study has recently been directed to development of an electrolytic solution having high conductivity. Among the electrolytic solutions proposed to date, those comprising a quaternary ammonium salt of an organic acid, especially a carboxylic acid, as a solute, and an aprotic solvent, e.g., $\gamma$-butyrolactone, are noteworthy for their high conductivity. Electrolytic solutions of this type are described, e.g., in JP-B-3-6646 and JP-B-3-8092 (the term "JP-B" as used herein means an "examined published Japanese patent application").

Such a highly conductive electrolytic solution generally has a low dielectric strength in itself and has been used in a region of a rated voltage of 50 V or less. For use in a region having a rated voltage exceeding 50 V, dielectric strength may be increased by a combined use with an electrolytic solution suitable for use in a high-voltage region, such as a boric acid-ethylene glycol system. Such a combined use, however, unavoidably results in a considerable reduction in conductivity because of low conductivity of the electrolytic solution for a high-voltage region. It is possible to prevent conductivity reduction by addition of water, but such a manipulation is known to adversely affect the upper working limit of temperature and the working life of the electrolytic solution and is not therefore recommended.

It has also been proposed to add to a highly conductive electrolytic solution a chemical effective on improvement of dielectric strength. Among this approach is addition of an alkyl phosphate, as disclosed, e.g., in JP-A-3-209810 (the term "JP-A" as used herein means an "unexamined published Japanese patent application").

Further, addition of a dispersion of colloidal silicon dioxide has been proved effective to improve dielectric strength as disclosed in JP-A-4-58512.

These conventional approaches for increasing dielectric strength of a highly conductive electrolytic solution each have disadvantages. That is, a combination of an otherwise highly conductive electrolytic solution with an electrolytic solution for a high-voltage region involves a great reduction in conductivity as mentioned above and fails to satisfy both conductivity and dielectric strength requirements. In the case of using various additives, some additives improve dielectric strength only to an insufficient extent; or an increase in dielectric strength is limited to a certain level, and no further improvement is obtained even with an increased amount of the additive; or some additives adversely affect conductivity. Further, some additives seemingly attain an increased dielectric strength, but the increased level of dielectric strength is too unstable and unreliable and cannot be maintained in the final product solution.

SUMMARY OF THE INVENTION

An object of the present invention is to provide an electrolytic solution which has an improved dielectric strength in a stable manner with a minimized reduction in conductivity.

The inventors have found that an electrolytic solution meeting the above object can be obtained by adding to a specific electrolytic solution a combination of colloidal silica and a specific phosphorous compound. The present invention has been completed based on this finding.

The present invention relates to an electrolytic solution comprising a mixed solvent of $\gamma$-butyrolactone and ethylene glycol having dissolved therein a quaternary ammonium salt formed with an anion component selected from carboxylic acids, particularly phthalic acid, maleic acid, and benzoic acid, and a quaternary ammonium cation component, particularly a quaternary alkylammonium, as a solute, said electrolytic solution (hereinafter referred to as a basic solution) further containing from 0.5 to 10 parts by weight of colloidal silica and from 0.5 to 8 parts of at least one phosphorus compound selected from dialkyl phosphate and phosphorous acid, per 100 parts by weight of the basic solution.

DETAILED DESCRIPTION OF THE INVENTION

The solute in the basic solution is composed of an anion component selected from phthalic acid, maleic acid and benzoic acid and a quaternary alkylammonium cation component.

Examples of the quaternary alkylammonium cation component include those represented by formula

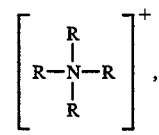

wherein R independently represents a saturated or unsaturated, branched or unbranched alkyl group and preferably an alkyl group having 1 to 4 carbon atoms. Preferred examples thereof include symmetric or asymmetric quaternary ammonium cations containing from 1 to 4 carbon atoms in the alkyl moiety thereof such as tetramethylammonium, tetraethylammonium and triethylmethylammonium.

The concentration of the solute is not particularly critical but usually ranges from about 5 to 25% by weight and preferably from 10 to 20% by weight based on the basic solution.

The solvent of the basic solution is a mixture of γ-butyrolactone and ethylene glycol. A mixing ratio of ethylene glycol to γ-butyrolactone desirably ranges generally from 0.05 to 0.4 by weight and preferably from 0.1 to 0.4 by weight.

Colloidal silica is scarcely soluble in any solvent and is usually added to the basic solution in the form of a colloidal solution in an appropriate dispersion medium. The dispersion medium to be used is not particularly limited. In particular, the same solvent as used in the basic solution, i.e., γ-butyrolactone or ethylene glycol, is preferred in view of minimized influences on characteristics of the basic solution and easy diffusion into the electrolytic solution.

Colloidal silica is preferably added in an amount of from 0.5 to 10 parts by weight, and more preferably of from 3 to 6 parts by weight, per 100 parts by weight of the basic solution.

The mean particle size of the colloidal silica is preferably 1 to 100 nm, more preferably from 1 to 40 nm.

As a method of preparing silica fine particles in the present invention, wet methods such as an ion exchange method, a peptization method and a sol gel method are preferred as compared with dry methods such as a combustion method.

Examples of the dialkyl phosphate to be used as the phosphorous compound in the present invention include dibutyl phosphate (hereinafter abbreviated as DBP) and di(2-ethylhexyl)phosphate (hereinafter abbreviated as DOP). The phosphorous compound(s) of the present invention is/are generally added in a total amount of from 0.5 to 8 parts by weight, preferably from of 0.5 to 5 parts by weight and more preferably of from 1 to 3 parts by weight, per 100 parts by weight of the basic solution. Two or more phosphorus compounds of the present invention may be used in combination.

The electrolytic solution for an electrolytic capacitor of the present invention can be prepared by adding the colloidal silica and at least one of DBP and phosphorous acid in the basic solution in the manner mentioned above.

Furthermore, the electrolytic solution of the present invention further may contain various co-solvents and co-solutes to the extent that they do not inhibit performance of the basic solution in terms of conductivity, dielectric strength and working life. Examples of the co-solvent and the co-solute include 2-methoxyethanol and nitrobenzene derivatives, respectively.

While colloidal silica, DBP, and phosphorous acid, even when used individually, are each effective to some extent to increase dielectric strength of an electrolytic solution, a combination of colloidal silica and DBP and/or phosphorous acid brings about an unexpected improvement in dielectric constant to such a high level that is never reached by the individual use. Moreover, the improvement can be obtained without being accompanied by a substantial reduction or sacrifice of the high conductivity inherently possessed by the basic solution.

The present invention is now illustrated in greater detail with reference to Examples, but it should be understood that the present invention should not be construed as being limited thereto. All the percents are by weight unless otherwise indicated.

EXAMPLE 1

Basic solutions 1 to 3 were prepared by dissolving tetramethylammoniumphthalate, triethylmethylammonium maleate, or triethylmethylammonium benzoate, respectively, in a mixed solvent comprising 65% of γ-butyrolactone and 20% of ethylene glycol to a concentration of 15%.

DBP, phosphorous acid, or colloidal silica was added to each of basic solutions 1 to 3 in the amount (parts by weight per 100 parts of each basic solution) as shown in Tables 1 to 3 below to prepare an electrolytic solution. The colloidal silica was added as a 20% solution in ethylene glycol. In particular, EG-ST, manufactured by Nissan Chemical Industries, Ltd. was used.

The resulting electrolytic solutions were evaluated in terms of conductivity and dielectric strength (sparking voltage) measured under the following conditions.

1) Conductivity (mS/cm) (millisiemens/cm)

Measured at 25° C. The conductivity of the electrolytic solution for an electrolytic capacitor is preferably at least 5 mS/cm and more preferably from 5 to 7 mS/cm.

2) Dielectric Strength (V)

An electrolytic capacitor for a dielectric strength test was prepared by using each electrolytic solution. A constant current of 5 mA was applied at 25° C. to obtain a voltage vs. time curve. The voltage at which sparkling or scintillation was observed for the first time was taken as a dielectric strength.

The electrolytic capacitor using basic solution 1 or 3 was assembled as follows. An anode foil prepared by formation at 160 V was coiled together with a separator and a cathode foil to form a capacitor element with lead wires at the end thereof. The capacitor element was impregnated with basic solution 1 or 3 at 40° C. under reduced pressure for 40 minutes. The impregnated element was put in a metallic case, and the open end of the case was closed with a rubber seal. The terminal of the case was fastened with a screw to obtain an electrolytic capacitor. The resulting electrolytic capacitor had a rated voltage of 100 WV (working voltage) and a capacitance of 22 μF.

Since basic solution 2 has potentiality of obtaining a considerable dielectric strength by addition of a phosphorus compound alone, the electrolytic capacitor for a dielectric strength test using basic solution 2 was prepared in the same manner as described above, except that the anode foil was prepared by formation at a higher voltage, i.e., 240 V and impregnation was conducted for 1 hour. The resulting electrolytic capacitor had a rated voltage of 160 WV and a capacitance of 22 μF.

The results of the measurements are shown in Tables 1 to 3.

TABLE 1

| | Basic Solution 1 | | | | |
|---|---|---|---|---|---|
| | Additive | | | Conductivity (mS/cm) | Dielectric Strength (V) |
| Run No. | DBP | Phosphorous Acid | Colloidal Silica | | |
| Comparison: | | | | | |
| 1-1 | — | — | — | 7.97 | 75 |
| 1-2 | 2 | — | — | 6.66 | 76 |

TABLE 1-continued

| Run No. | Basic Solution 1 | | | Conductivity (mS/cm) | Dielectric Strength (V) |
|---|---|---|---|---|---|
| | Additive | | | | |
| | DBP | Phosphorous Acid | Colloidal Silica | | |
| 1-3 | — | 2 | — | 5.91 | 103 |
| 1-4 | — | — | 5 | 7.53 | 107 |
| Invention: | | | | | |
| 1-5 | 2 | — | 5 | 6.20 | 149 |
| 1-6 | — | 2 | 5 | 5.04 | 111 |

As is apparent from the test results in Table 1, the electrolytic capacitors using the electrolytic solution according to the present invention in Run Nos. 1-5 and 1-6 have high dielectric strength as compared to Comparison Run Nos. 1-1 to 1-4. Further, the reduction in conductivity caused by addition of the DBP or phosphorous acid additives according to the present invention was relatively small.

TABLE 2

| Run No. | Basic Solution 2 | | | Conductivity (mS/cm) | Dielectric Strength (V) |
|---|---|---|---|---|---|
| | Additive | | | | |
| | DBP | Phosphorous Acid | Colloidal Silica | | |
| Comparison: | | | | | |
| 2-1 | — | — | — | 9.34 | 62 |
| 2-2 | 2 | — | — | 8.03 | 152 |
| 2-3 | — | 2 | — | 7.39 | 165 |
| 2-4 | — | — | 5 | 8.79 | 75 |
| Invention: | | | | | |
| 2-5 | 2 | — | 5 | 7.41 | >240 |
| 2-6 | — | 2 | 5 | 6.64 | 200 |

Similarly to the results of Table 1, the results in Table 2 prove that the electrolytic capacitors using the electrolytic solution of the present invention exhibit improved dielectric strength while minimizing any reduction in conductivity. In particular, the results of Run No. 2-5 reveal the dielectric strength limit assigned to the formation voltage of the anode, indicating that the electrolytic solution of the present invention per se possesses a dielectric strength higher than the anode formation voltage.

TABLE 3

| Run No. | Basic Solution 3 | | | Conductivity (mS/cm) | Dielectric Strength (V) |
|---|---|---|---|---|---|
| | Additive | | | | |
| | DBP | Phosphorous Acid | Colloidal Silica | | |
| Comparison: | | | | | |
| 3-1 | — | — | — | 6.24 | 87 |
| 3-2 | 2 | — | — | 6.02 | 90 |
| 3-3 | — | 2 | — | 5.85 | 145 |
| 3-4 | — | — | 5 | 5.87 | 150 |
| Invention: | | | | | |
| 3-5 | 2 | — | 5 | 5.50 | >160 |
| 3-6 | — | 2 | 5 | 5.27 | >160 |

The results in Table 3 also show a marked improvement in dielectric strength to a level higher than the anode formation voltage (the dielectric strength of the anode foil per se).

As described and demonstrated above, the electrolytic solution according to the present invention has a high dielectric strength while retaining a high conductivity of the basic solution. Therefore, an electrolytic capacitor using the electrolytic solution of the present invention exhibits, even in a high rated voltage region exceeding 50 V, low impedance characteristics with a small conductivity loss which have conventionally been attained only in a low rated voltage region of 50 V or less.

EXAMPLE 2

Electrolytic Solution Run Nos. 4-1 to 4-5 comprising 20% by weight of triethylmethylammonium benzoate, 64% by weight of $\gamma$-butyrolactone, 16% by weight of ethylene glycol, the amounts indicated in Table 4 of silica and DOP, were prepared. The measurement of conductivity and dielectric strength of each electrolytic solution was carried out in the same manner as in Example 1 except that the dielectric strength test was carried out using the electrolytic capacitors prepared in the same manner as the preparation of the electrolytic capacitor for the basic solution 2 of Example 1 and at a temperature of 110° C. The results are shown in Table 4.

TABLE 4

| Run No. | DOP | Colloidal Silica | Conductivity (mS/cm) | Dielectric Strength (V) |
|---|---|---|---|---|
| Comparison: | | | | |
| 4-1 | — | — | 7.50 | 75 |
| 4-2 | 2 | — | 7.09 | 75 |
| 4-3 | — | 6 | 7.07 | 135 |
| Invention: | | | | |
| 4-4 | 2 | 6 | 6.48 | 160 |
| 4-5 | 5 | 6 | 5.82 | 200 |

It can be seen from Table 4 that the addition of DOP also improved the electrolytic solutions.

While the invention has been described in detail and with reference to specific examples thereof, it will be apparent to one skilled in the art that various changes and modifications can be made therein without departing from the spirit and scope thereof.

What is claimed is:

1. An electrolytic solution for an electrolytic capacitor, comprising a solution comprising a mixed solvent of $\gamma$-butyrolactone and ethylene glycol having dissolved therein a quaternary alkylammonium salt formed with an anion component selected from the group consisting of phthalic acid, maleic acid, and benzoic acid, as a solute, wherein the solution further contains colloidal silica in an amount of from 0.5 to 10 parts by weight per 100 parts by weight of the solution and at least one phosphorus compound selected from the group consisting of dibutyl phosphate and phosphorous acid in a total amount of from 0.5 to 5 parts by weight, per 100 parts by weight of the solution.

2. The electrolytic solution as in claim 1, wherein said at least one phosphorous compound comprises dibutyl phosphate.

3. The electrolytic solution as in claim 1, wherein said at least one phosphorous compound comprises phosphorous acid.

4. The electrolytic solution as in claim 1, wherein said quaternary alkylammonium salt is present in a concentration of from 5 to 25% by weight based on the solution.

5. The electrolytic solution as in claim 1, wherein a mixing weight ratio of said ethylene glycol to said $\gamma$-butyrolactone is from 0.05 to 0.4.

6. The electrolytic solution as in claim 1, wherein said colloidal silica is present in an amount of from 3 to 6 parts by weight per 100 parts by weight of the solution.

7. The electrolytic solution as in claim 1, wherein said quaternary alkylammonium salt comprises a cation component containing from 1 to 4 carbon atoms in the alkyl moiety thereof.

8. The electrolytic solution as in claim 1, wherein said colloidal silica is added to the solution in a dispersion medium comprising a solvent selected from at least one of γ-butyrolactone and ethylene glycol.

9. The electrolytic solution as in claim 1, wherein said colloidal silica has a mean particle size of 1 to 100 nm.

* * * * *